(No Model.)
E. D. BANGS.
METALLIC PACKING.
No. 506,028. Patented Oct. 3, 1893.
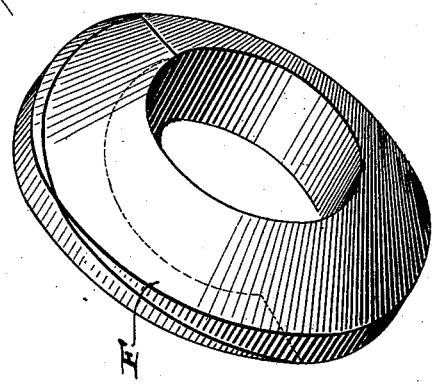
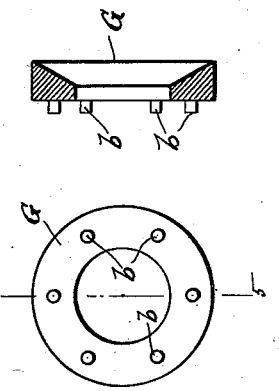
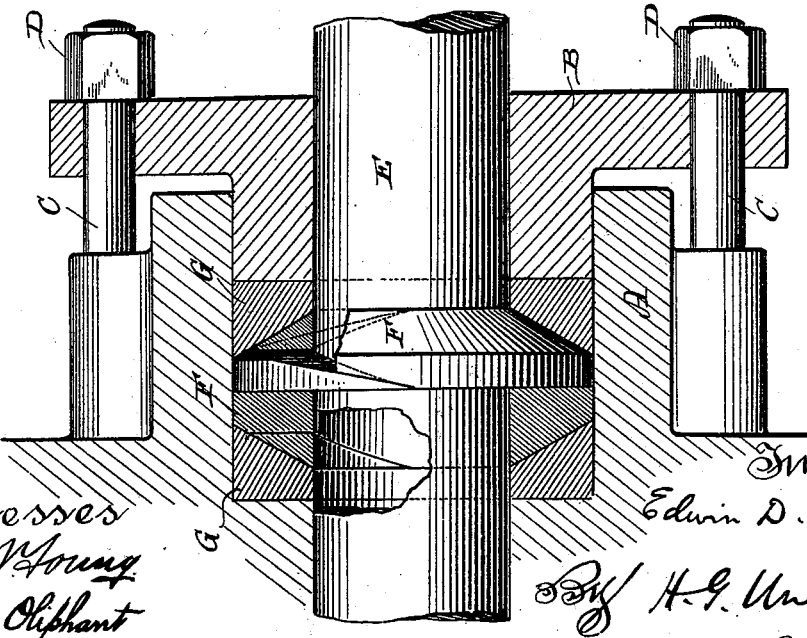
Witnesses
Geo. W. Young
N. E. Oliphant
Inventor
Edwin D. Bangs.
By H. G. Underwood.
Attorney

UNITED STATES PATENT OFFICE.

EDWIN D. BANGS, OF MILWAUKEE, WISCONSIN.

METALLIC PACKING.

SPECIFICATION forming part of Letters Patent No. 506,028, dated October 3, 1893.

Application filed January 3, 1893. Serial No. 457,011. (No model.)

*To all whom it may concern:*

Be it known that I, EDWIN D. BANGS, a citizen of the United States, and a resident of Milwaukee, in the county of Milwaukee, and in the State of Wisconsin, have invented certain new and useful Improvements in Metallic Packing; and I do hereby declare that the following is a full, clear, and exact description thereof.

My invention has for its object to provide a simple and economical steam-tight metallic packing, particularly designed for piston-rods and valve-stems, said invention consisting in certain peculiarities of construction and combination of parts hereinafter described with reference to the accompanying drawings and subsequently claimed.

In the drawings: Figure 1 represents a sectional view of a stuffing-box, an elevation of a portion of a piston-rod partly broken away, and my improved packing partly in elevation, partly in section on the same plane as the section of the stuffing-box and otherwise in section on line 1—1 of the succeeding figure; Fig. 2, an elevation of a packing-ring partly broken away; Fig. 3, a perspective view of said packing-ring; Fig. 4, a rear view of another form of packing-ring, and Fig. 5, a section taken on line 5—5 of the preceding figure.

Referring by letter to the drawings A represents a stuffing-box at the end of a steam-cylinder, B a gland that enters the stuffing-box, C the cylinder-bolts with which the gland is loosely engaged, D the nuts that engage the bolt to retain said gland in position.

Working in the stuffing-box is a piston-rod E surrounded by a metallic packing, the latter being constructed according to my invention and hereinafter more particularly described. The packing may consist of an indefinite number of sections, each of which necessarily comprises two rings F, G, of antifriction metal, one of these rings being partly conical upon its exterior and the other likewise conical upon its interior on an angle of suitable degree. The conical portions of the rings in each section of the packing are engaged, as shown in Fig. 1, and it is essential to the success of my invention that at least one of said rings in each pair be split diagonally across its periphery in such a manner as to have the split intercept the bore and terminate on opposite sides of said ring transverse thereto, whereby this ring is free to contract or expand spirally on itself. The split is made by a saw, and the loss of metal incidental to the kerf permits of the spiral contraction or expansion of the ring within certain sufficient limits without variation as to width of face at any point.

In Fig. 1, I have shown two sections of my improved packing, the rings F of which are split and placed back to back or so disposed as to have their exterior conical portions extend in opposite directions. The ring G of one section of the packing abuts against the steam-cylinder, and the similar ring of the other section is in contact with the gland B above specified. By the tightening up of the follower it will be seen that a pressure is exerted on the packing and incidental to this pressure there is a compression of the split-rings F against the piston-rod, this compression being due to the conical engagement of the rings in each section of said packing.

In some uses of my improved packing it is desirable to have an expansion of one ring in each section coincident with a compression of the other ring in the same section and this result is obtained by having both rings split in the manner above specified.

In Fig. 4 I have shown the ring G of one packing-section provided with a series of spurs *b* designed to rest against a cylinder-head and thereby provide for a steam-space in the stuffing-box, this construction and arrangement of parts being desirable when my packing is employed for the piston-rods of locomotives, inasmuch as when steam is on, all of the packing is under pressure against the follower of the stuffing-box, and the necessary compression of the rings F ensues, but if steam be cut off there is a consequent relax of pressure and corresponding expansion of said rings to prevent the relative piston-rod from running hot, it being understood that while steam is on there is lubrication between said rod and packing.

While I have shown and more particularly described my improved packing in connection with a piston-rod, it is equally applicable to valve-stems, and will be found much more economical than the packing in common use, as well as less troublesome to put in place, inasmuch as there are no joints to break in arranging successive sections of said packing.

Having thus fully described my invention, what I claim as new, and desire to secure by Letters Patent, is—

1. A packing comprising rings of anti-friction metal arranged in pairs and having engaging conical surfaces, at least one ring in each pair being split diagonally across its periphery, the split intercepting the bore of the ring and terminating on opposite sides of said ring transverse thereto, whereby said ring is free to contract or expand spirally on itself substantially as set forth.

2. A packing comprising rings of anti-friction metal arranged in pairs and having engaging conical surfaces, at least one ring in each pair being split diagonally across its periphery, the split intercepting the bore of the ring and terminating on opposite sides of said ring transverse thereto; whereby said ring is free to contract or expand spirally on itself, as shown and spurs on a terminal ring of the packing in position to oppose a cylinder-head adjacent to a stuffing-box in which said packing may be contained, substantially as set forth.

3. A packing that comprises at least two rings of anti-friction metal one of which has a partly conical exterior engaging a corresponding conical interior of the other, and is split diagonally across its periphery, the split intercepting the bore of the ring and terminating on opposite sides of said ring transverse thereto, whereby said ring is free to contract or expand spirally on itself substantially as set forth.

In testimony that I claim the foregoing I have hereunto set my hand, at Milwaukee, in the county of Milwaukee and State of Wisconsin, in the presence of two witnesses.

EDWIN D. BANGS.

Witnesses:
H. G. UNDERWOOD,
N. E. OLIPHANT.